United States Patent
Zheng et al.

(10) Patent No.: US 12,047,107 B2
(45) Date of Patent: Jul. 23, 2024

(54) COMMUNICATION APPARATUS

(71) Applicant: HUAWEI TECHNOLOGIES CO., LTD., Guangdong (CN)

(72) Inventors: Xiaojun Zheng, Shanghai (CN); Wei Chen, Shanghai (CN); Jianming Cui, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 312 days.

(21) Appl. No.: 17/707,152

(22) Filed: Mar. 29, 2022

(65) Prior Publication Data

US 2022/0224368 A1 Jul. 14, 2022

Related U.S. Application Data

(63) Continuation of application No. PCT/CN2020/103072, filed on Jul. 20, 2020.

(30) Foreign Application Priority Data

Sep. 30, 2019 (CN) .......................... 201910944620.3

(51) Int. Cl.
*H04B 1/38* (2015.01)
*H04B 1/04* (2006.01)

(52) U.S. Cl.
CPC ............. *H04B 1/38* (2013.01); *H04B 1/0458* (2013.01); *H04B 1/0483* (2013.01); *H04B 2001/0408* (2013.01)

(58) Field of Classification Search
CPC ...... H04B 1/04; H04B 1/0458; H04B 1/0483; H04B 1/38; H04B 1/3827; H04B 1/3833;
(Continued)

(56) References Cited

U.S. PATENT DOCUMENTS 8,280,325 B2 * 10/2012 Zolfaghari ........... H04B 1/0067
455/552.1
9,871,488 B2 * 1/2018 Lin ....................... H04B 1/401
(Continued)

FOREIGN PATENT DOCUMENTS

| CN | 106160758 A | 11/2016 |
| CN | 205961093 U | 2/2017 |

(Continued)

*Primary Examiner* — Quochien B Vuong
(74) *Attorney, Agent, or Firm* — WOMBLE BOND DICKINSON (US) LLP

(57) ABSTRACT

Embodiments of this application disclose a communication apparatus. The communication apparatus may include a first transceiver, a second transceiver, and a power amplifier. The first transceiver and the second transceiver may be separately connected to the power amplifier. In this way, when it is determined that a network load is relatively low, any transceiver in the communication apparatus may be turned off. Because the turned-off transceiver no longer continues to generate power consumption, power consumption of the entire communication apparatus is reduced, to achieve an energy saving effect. In addition, when an electronic component in the communication apparatus is turned off, the power amplifier may not be turned off, and the power amplifier may still receive a corresponding radio frequency signal from a transceiver that is not turned off, to perform power amplification and send a corresponding radio frequency signal.

10 Claims, 8 Drawing Sheets

(58) Field of Classification Search
CPC .. H04B 1/40; H04B 1/401; H04B 2001/0408; H04W 52/02; H04W 52/0206
See application file for complete search history.

(56) References Cited

U.S. PATENT DOCUMENTS

| | | |
|---|---|---|
| 10,187,137 B2 * | 1/2019 | Weissman ............ H04B 1/0483 |
| 10,211,861 B2 * | 2/2019 | Vaillancourt ........ H04B 1/0458 |
| 10,348,358 B1 | 7/2019 | Ramakrishnan et al. |
| 11,303,316 B2 * | 4/2022 | Choi ....................... H04B 1/40 |
| 2008/0136554 A1 | 6/2008 | He et al. |
| 2013/0065541 A1 | 3/2013 | Lum et al. |
| 2016/0218674 A1 | 7/2016 | Lin |
| 2017/0366965 A1 * | 12/2017 | Chen ....................... H04W 4/90 |
| 2019/0229764 A1 | 7/2019 | Kang et al. |

FOREIGN PATENT DOCUMENTS

| | | |
|---|---|---|
| CN | 106470473 A | 3/2017 |
| CN | 106506034 A | 3/2017 |
| CN | 106603129 A | 4/2017 |
| CN | 106797200 A | 5/2017 |
| CN | 107046723 A | 8/2017 |
| CN | 107210717 A | 9/2017 |
| CN | 107528964 A | 12/2017 |
| CN | 109104214 A | 12/2018 |
| CN | 209030443 U | 6/2019 |
| KR | 20060105103 A | 10/2006 |
| WO | 2019149153 A1 | 8/2019 |

* cited by examiner

COMMUNICATION APPARATUS

CROSS-REFERENCE TO RELATED APPLICATIONS

This application is a continuation of International Application No. PCT/CN2020/103072, filed on Jul. 20, 2020, which claims priority to Chinese Patent Application No. 201910944620.3, filed on Sep. 30, 2019. The disclosures of the aforementioned applications are incorporated herein by reference in their entireties.

TECHNICAL FIELD

This application relates to the field of communication technologies, and in particular, to a communication apparatus.

BACKGROUND

As mobile communication networks in which long term evolution (LTE) and a $5^{th}$ generation mobile communication technology (5G) are used continuously develop, a multi-antenna technology, for example, a multiple-input multiple-output (MIMO) technology, gradually becomes a core technology of mobile communication and is mainly deployed by operators. The multi-antenna technology means that a plurality of transmit antennas and/or a plurality of receive antennas are separately used at a transmit end and a receive end, and the plurality of antennas at the transmit end are configured to send a signal and/or the plurality of antennas at the receive end are configured to receive a signal. This can not only improve communication quality of the signals, but also exponentially increase a channel capacity of a system by receiving and transmitting the signals through the plurality of antennas, without increasing a spectrum resource and antenna transmit power.

However, when the multi-antenna technology improves the communication quality of the signals and increases the channel capacity of the system, the multi-antenna technology also brings a problem of high power consumption to the operators. Therefore, it is very necessary to reduce the power consumption of the system when the multi-antenna technology is applied.

SUMMARY

To resolve the foregoing problem, embodiments of this application provide a communication apparatus, so that when a multi-antenna technology is applied, power consumption of a system can be reduced based on the communication apparatus, to implement energy saving.

According to a first aspect, an embodiment of this application provides a communication apparatus. The communication apparatus may include a first transceiver, a second transceiver, and a first power amplifier. The first transceiver and the second transceiver may be separately connected to the first power amplifier. In this implementation, when the communication apparatus is configured to implement application of a multi-antenna technology, if a current network load of a system is relatively low, and the system needs to save energy, the first transceiver or the second transceiver in the communication apparatus may be turned off. Because one of the transceivers in the communication apparatus is turned off, the turned-off transceiver no longer continues to generate power consumption, and power consumption of the entire communication apparatus is reduced. In this way, power consumption of the system can be reduced when the multi-antenna technology is applied, to achieve an energy saving effect. In addition, after one of the transceivers in the communication apparatus is turned off, the first power amplifier may still receive a corresponding radio frequency signal from a transceiver that is not turned off, to perform power amplification and send a corresponding radio frequency signal, so that a channel capacity of the system remains basically unchanged. In addition, an antenna gain is not reduced, so that a network signal coverage area is not reduced.

In a possible embodiment, the communication apparatus may further include a second power amplifier. The first transceiver and the second transceiver may be separately connected to the second power amplifier. In this embodiment, each power amplifier in the communication apparatus may be connected to a plurality of transceivers. For example, when the communication apparatus further includes the second power amplifier, the second power amplifier may further be connected to the first transceiver and the second transceiver. In this way, similar to the first power amplifier, when the first transceiver or the second transceiver connected to the second power amplifier is turned off, the second power amplifier may still receive a radio frequency signal from a transceiver that is not turned off, so that when energy saving of the system is implemented by using the transceiver, the channel capacity of the system may remain basically unchanged, and the network signal coverage area is not reduced.

In a further possible embodiment, the communication apparatus further includes a first bridge. The first transceiver is connected to a first port of the first bridge, and the second transceiver is connected to a second port of the first bridge. A third port of the first bridge is connected to the first power amplifier, and a fourth port of the first bridge is connected to the second power amplifier. The first port of the first bridge is separately connected to the third port of the first bridge and the fourth port of the first bridge, and the second port of the first bridge is separately connected to the third port of the first bridge and the fourth port of the first bridge. In this embodiment, the communication apparatus may include at least two power amplifiers, and each transceiver may be connected to two power amplifiers through a bridge. In this way, when any transceiver in the communication apparatus is turned off, a remaining transceiver may also implement a signal output by using the two power amplifiers, so that when the energy saving of the system is implemented, the channel capacity and the network signal coverage area of the system are not reduced.

In a possible embodiment, the communication apparatus further includes a first processor. The first processor is separately connected to the first transceiver and the second transceiver. The first processor is configured to separately perform weighted summation processing on a first baseband signal and a second baseband signal based on a first weighting matrix, to obtain a third baseband signal and a fourth baseband signal. The third baseband signal is output to the first transceiver, the fourth baseband signal is output to the second transceiver, and the first weighting matrix is an inverse matrix of a bridge matrix of the first bridge. In this embodiment, the first processor is added to perform weighted summation processing on baseband signals output to the transceivers, so that there is a one-to-one correspondence between the transceivers and the power amplifiers. To be specific, a radio frequency signal received by each power amplifier may be a radio frequency signal output by one transceiver, instead of a mixture of radio frequency signals output by a plurality of transceivers.

In some possible embodiments, the communication apparatus further includes a third transceiver, a fourth transceiver, a third power amplifier, a fourth power amplifier, a second bridge, a third bridge, and a fourth bridge. The first transceiver is connected to a first port of the second bridge, and a third port of the second bridge is connected to the first port of the first bridge. The second transceiver is connected to a first port of the third bridge, and a third port of the third bridge is connected to the second port of the first bridge. The third transceiver is connected to a second port of the second bridge, and a fourth port of the second bridge is connected to a first port of the fourth bridge. The fourth transceiver is connected to a second port of the third bridge, and a fourth port of the third bridge is connected to a second port of the fourth bridge. A third port of the fourth bridge is connected to the third power amplifier, and a fourth port of the fourth bridge is connected to the fourth power amplifier. The first port of the second bridge is separately connected to the third port of the second bridge and the fourth port of the second bridge, and the second port of the second bridge is separately connected to the third port of the second bridge and the fourth port of the second bridge. The first port of the third bridge is separately connected to the third port of the third bridge and the fourth port of the third bridge, and the second port of the third bridge is separately connected to the third port of the third bridge and the fourth port of the third bridge. The first port of the fourth bridge is separately connected to the third port of the fourth bridge and the fourth port of the fourth bridge, and the second port of the fourth bridge is separately connected to the third port of the fourth bridge and the fourth port of the fourth bridge. In the embodiments, four transceivers and four power amplifiers in the communication apparatus may be connected through four bridges, and based on the four bridges, a radio frequency signal received by each power amplifier may be a mixture of radio frequency signals output by the four transceivers. In other words, each power amplifier may be connected to the four transceivers at the same time, and receive the radio frequency signals output by the four transceivers. In this way, even if one to three transceivers are turned off to reduce energy consumption of the system, each power amplifier can receive a radio frequency signal sent by a remaining transceiver, so that the channel capacity and the network signal coverage area of the system are not reduced.

In some possible embodiments, the communication apparatus further includes a first switch and a second switch. The third port of the third bridge is connected to one end of the first switch, and the other end of the first switch is connected to the second port of the first bridge. The fourth port of the second bridge is connected to one end of the second switch, and the other end of the second switch is connected to the first port of the fourth bridge. When the second transceiver and the third transceiver are turned off, or when the first transceiver and the fourth transceiver are turned off, the first switch and the second switch are turned off. In the embodiments, a connection switch may further be disposed between the bridges, so that when two of the four transceivers are turned off, each power amplifier can receive a radio frequency signal output by one transceiver, and radio frequency signals received by two of the power amplifiers are radio frequency signals output by a same transceiver, and radio frequency signals received by the other two power amplifiers are radio frequency signals output by the other transceiver. In actual application, when the system needs to save energy, the connection switch disposed between the four bridges may be turned off, and a corresponding transceiver may be turned off, to reduce energy consumption of the system.

In some possible embodiments, the communication apparatus further includes a third switch. The second transceiver is connected to the first power amplifier through the third switch. In the embodiments, the third switch may be disposed between the second transceiver and the first power amplifier. When the first transceiver is turned off based on an energy saving requirement of the system, the third switch may be turned on. In this way, the second transceiver may be connected to the first power amplifier, and therefore the first power amplifier may still receive a radio frequency signal output by the second transceiver, so that when energy saving is implemented, the channel capacity and the network signal coverage area of the system are not reduced.

In some possible embodiments, the communication apparatus is a remote radio unit (RRU).

In some possible embodiments, the communication apparatus further includes a first group of antennas. The first power amplifier is connected to the first group of antennas. In the embodiments, the communication apparatus may send, through the first group of antennas, a radio frequency signal amplified by the first power amplifier, and may also receive, through the first group of antennas, a signal sent by a client (for example, user equipment), and perform power amplification on the signal by using the first power amplifier.

In some possible embodiments, the communication apparatus further includes a second group of antennas. The second power amplifier is connected to the second group of antennas. In the embodiments, the communication apparatus may send, through the second group of antennas, a radio frequency signal amplified by the second power amplifier, and may also receive, through the second group of antennas, the signal sent by the client, and perform power amplification on the signal by using the second power amplifier.

In some possible embodiments, the communication apparatus is an active antenna unit (AAU).

In some possible embodiments, the first processor included in the communication apparatus may be a building baseband unit (BBU).

In some possible embodiments, the communication apparatus may further be a base station.

In some possible embodiments, the communication apparatus further includes a second processor. The second processor is separately connected to the first transceiver, the second transceiver, the third transceiver, and the fourth transceiver. The second processor is configured to separately perform weighted summation processing on a first baseband signal, a second baseband signal, a third baseband signal, and a fourth baseband signal based on a second weighting matrix, to obtain a fifth baseband signal, a sixth baseband signal, a seventh baseband signal, and an eighth baseband signal. The fifth baseband signal is output to the first transceiver, the sixth baseband signal is output to the second transceiver, the seventh baseband signal is output to the third transceiver, and the eighth baseband signal is output to the fourth transceiver. The second weighting matrix is an inverse matrix of a third weighting matrix, and the third weighting matrix is a combination bridge matrix obtained by determining based on a bridge matrix of the first bridge, a bridge matrix of the second bridge, a bridge matrix of the third bridge, a bridge matrix of the fourth bridge, and a connection relationship between the first bridge, the second bridge, the third bridge, and the fourth bridge. In the embodiments, when at least four transceivers and at least four power amplifiers in the communication apparatus are connected through four bridges, the second processor is correspondingly added, so that a signal received by each power amplifier may be a signal output by a single transceiver, and may not be a mixture of radio frequency signals output by four transceivers. In this way, a one-to-one correspondence between the transceivers and the power amplifiers may be established.

In some possible embodiments, the first port of the first bridge and the second port of the first bridge are input ports, and the third port of the first bridge and the fourth port of the first bridge are output ports. In the embodiments, when the communication apparatus sends a radio frequency signal to the client, a radio frequency signal output by the first transceiver may be input to the first bridge through the first port, and output to the first power amplifier through the third port, so that the first power amplifier performs power amplification on the radio frequency signal, and then sends a signal. Similarly, a radio frequency signal output by the second transceiver may be input to the first bridge through the second port, and output to the second power amplifier through the fourth port for power amplification, and then a signal is sent.

In some possible embodiments, the first port of the first bridge and the second port of the first bridge are output ports, and the third port of the first bridge and the fourth port of the first bridge are input ports. In the embodiments, when the communication apparatus receives a radio frequency signal sent by the client, the third port and the fourth port of the first bridge may become signal input ports, the signal is transmitted to the first transceiver through the first port that is used as a signal output port, and the signal is transmitted to the second transceiver through the second port that is used as a signal output port.

In some possible embodiments, the communication apparatus further includes a fourth processor. The fourth processor is separately connected to the first transceiver and the second transceiver. The fourth processor is configured to separately perform, based on a fourth weighting matrix, weighted summation processing on a first baseband signal output by the first transceiver and a second baseband signal output by the first transceiver, to obtain a third baseband signal and a fourth baseband signal. The fourth weighting matrix is an inverse matrix of a bridge matrix of the first bridge. In the embodiments, when the system receives the signal sent by the client, the fourth processor may be configured to perform weighted summation processing on a mixed signal that corresponds to a plurality of clients and that is received by a same power amplifier, so that a signal finally output to each transceiver is a baseband signal corresponding to a single client, and in actual application, may be a baseband signal sent by a client that completes pairing with the transceiver, instead of a mixture of baseband signals sent by the plurality of clients.

In some possible embodiments, the first port of the first bridge, the second port of the first bridge, the first port of the second bridge, the second port of the second bridge, the first port of the third bridge, the second port of the third bridge, the first port of the fourth bridge, and the second port of the fourth bridge are all input ports. The third port of the first bridge, the fourth port of the first bridge, the third port of the second bridge, the fourth port of the second bridge, the third port of the third bridge, the fourth port of the third bridge, the third port of the fourth bridge, and the fourth port of the fourth bridge are all output ports. In the embodiments, when the communication apparatus sends the radio frequency signal to the client, the first port and the second port of each bridge may be used as input ports, and a radio frequency signal output by the transceiver may be output to the bridge through the first port or the second port of each bridge, and output to the power amplifier through the third port or the fourth port of a corresponding bridge, so that the power amplifier performs power amplification on the radio frequency signal and then completes signal sending.

In some possible embodiments, the first port of the first bridge, the second port of the first bridge, the first port of the second bridge, the second port of the second bridge, the first port of the third bridge, the second port of the third bridge, the first port of the fourth bridge, and the second port of the fourth bridge are all output ports. The third port of the first bridge, the fourth port of the first bridge, the third port of the second bridge, the fourth port of the second bridge, the third port of the third bridge, the fourth port of the third bridge, the third port of the fourth bridge, and the fourth port of the fourth bridge are all input ports. In the embodiments, the communication apparatus may receive the radio frequency signal sent by the client, input the radio frequency signal to the bridge through the third port or the fourth port of each bridge, and then output the signal to a corresponding transceiver through the first port or the second port of the corresponding bridge.

In some possible embodiments, the communication apparatus further includes a fifth processor. The fifth processor is separately connected to the first transceiver, the second transceiver, the third transceiver, and the fourth transceiver. The fifth processor is configured to separately perform weighted summation processing on a first baseband signal, a second baseband signal, a third baseband signal, and a fourth baseband signal based on a fifth weighting matrix, to obtain a fifth baseband signal, a sixth baseband signal, a seventh baseband signal, and an eighth baseband signal. The fifth weighting matrix is an inverse matrix of a sixth weighting matrix, and the sixth weighting matrix is a combination bridge matrix obtained by determining based on a bridge matrix of the first bridge, a bridge matrix of the second bridge, a bridge matrix of the third bridge, a bridge matrix of the fourth bridge, and a connection relationship between the first bridge, the second bridge, the third bridge, and the fourth bridge. When the system receives the signal sent by the client, the fifth processor may be configured to perform weighted summation processing on the mixed signal that corresponds to the plurality of clients and that is received by the same power amplifier, so that the signal finally output to each transceiver is the baseband signal from the single client, and in actual application, may be the baseband signal sent by the client that completes pairing with the transceiver, instead of the mixture of the baseband signals sent by the plurality of clients.

It can be learned from the foregoing technical solutions that embodiments of this application have the following advantages.

The communication apparatus provided in embodiments may include the first transceiver, the second transceiver, and the power amplifier. The first transceiver and the second transceiver may be separately connected to the power amplifier. In this way, when it is determined that the network load is relatively low, a redundant transceiver may end running. Therefore, any transceiver in the communication apparatus may be turned off. For example, the first transceiver or the second transceiver may be turned off. It may be understood that, in a process of implementing the application of the multi-antenna technology based on the communication apparatus, because one of the transceivers in the communication apparatus is turned off, the turned-off transceiver no longer generates power consumption, and the power consumption of the entire communication apparatus is reduced. In this way, the power consumption of the system can be reduced when the multi-antenna technology is applied, to achieve the energy saving effect. In addition, when an electronic component in the communication apparatus is turned off, one of the transceivers connected to the power amplifier is turned off, and the power amplifier may not be turned off. The power amplifier may still receive a corresponding radio frequency signal from a transceiver that is not turned off, to perform power amplification and send a corresponding radio frequency signal, so that the channel capacity of the system remains basically unchanged. In addition, the antenna gain is not reduced, so that the network signal coverage area is not reduced.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application, and a person of ordinary skill in the art may derive other drawings from these accompanying drawings.

DESCRIPTION OF EMBODIMENTS

Figure 1:
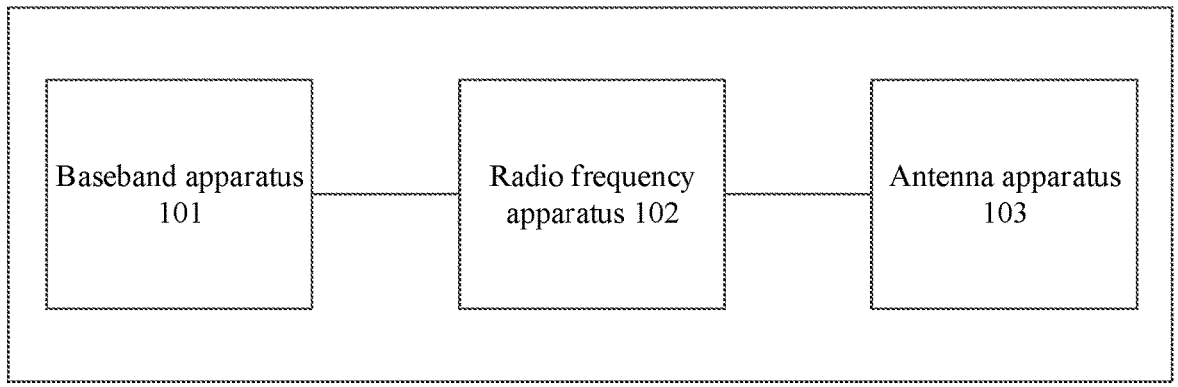
FIG. 1 is a schematic diagram of a structure of an example communication system according to an embodiment of this application.

Refer to FIG. 1. The technical solutions in embodiments of this application are applicable to a communication system shown in FIG. 1. The communication system may include a baseband apparatus 101, a radio frequency apparatus 102, and an antenna apparatus 103. The baseband apparatus 101 is connected to the radio frequency apparatus 102, and the radio frequency apparatus 102 is connected to the antenna apparatus 103. The communication system may be a base station.

The baseband apparatus 101 is configured to: process a communication protocol and communication data, control the entire base station, execute a software program, and process data of the software program. A chip in the baseband apparatus 101 may include a baseband processor and a central processing unit. The baseband processor is configured to process the communication protocol and the communication data. The central processing unit is configured to: control the entire base station, execute the software program, and process the data of the software program. Alternatively, functions of a baseband processor and a central processing unit may be integrated into a processor in the baseband apparatus 101. A person skilled in the art may understand that the baseband processor and the central processing unit each may be an independent processor, and are interconnected by using a technology such as a bus. A person skilled in the art may understand that the baseband apparatus 101 may include a plurality of baseband processors to adapt to different network standards, and the baseband apparatus 101 may include a plurality of central processing units to enhance a processing capability of the baseband apparatus 101. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in a memory in a form of a software program. The processor executes the software program to implement a baseband processing function. For example, the baseband apparatus may be a baseband unit (BBU).

The radio frequency apparatus 102 may be configured to: convert a received digital signal into a radio frequency signal, and send the radio frequency signal to the antenna apparatus 103; or receive a radio frequency signal from the antenna apparatus 103, convert the radio frequency signal into a digital signal, and send the digital signal to a baseband control unit. The antenna apparatus 103 may transmit a received radio frequency signal, or receive an external radio frequency signal and send the external radio frequency signal to the radio frequency apparatus 102.

The radio frequency apparatus 102 may include a plurality of radio frequency channels. It should be noted that the radio frequency channel herein may be a circuit channel in the radio frequency apparatus 102. The circuit channel may include one or more electronic components. The plurality of radio frequency channels may share the circuit channel, or each radio frequency channel may include a separate circuit channel. Alternatively, the radio frequency channel herein may be a logical channel in the radio frequency apparatus, and conversion between a baseband signal and a radio frequency signal may be completed in the logical channel. The logical channel may also be referred to as a transceiver, a transceiver unit, a transceiver machine, a transceiver apparatus, a radio frequency channel, a transceiver, or the like. Optionally, a component configured to implement a receiving function in the transceiver unit may be considered as a receiving unit. A component configured to implement a sending function in the transceiver unit may be considered as a sending unit. In other words, the transceiver unit includes the receiving unit and the sending unit. The receiving unit may also be referred to as a receiver, an input port, a receiver circuit, or the like. The sending unit may be referred to as a transmitter machine, a transmitter, a transmitter circuit, or the like. The radio frequency apparatus 102 and the antenna apparatus 103 may be physically separated.

For example, the radio frequency apparatus 102 may be a remote radio unit (RRU) or a radio frequency unit (RFU), the antenna apparatus 103 may be a plurality of antennas, and the plurality of antennas may be arranged in a radome. Certainly, the radio frequency apparatus 102 and the antenna apparatus 103 may alternatively be physically integrated together. For example, the system may be an active antenna unit (AAU).

The antenna apparatus 103 may include a plurality of antenna arrays. One antenna array herein may be referred to as one antenna. Each radio frequency channel is connected to a corresponding antenna array. Each radio frequency channel may send a radio frequency signal to the corresponding antenna array, and the corresponding antenna array transmits the radio frequency signal to the air. Each antenna array may include one or more antenna elements. It should be noted that the radio frequency channel being connected to the corresponding antenna array may indicate that the radio frequency channel is connected to each antenna element in the antenna array. The radio frequency channel sending the radio frequency signal to the corresponding antenna array may indicate that the radio frequency channel sends the radio frequency signal to each antenna element in the antenna array. The radio frequency channel sending the radio frequency signal to the antenna array may be understood as that the radio frequency signal is sent to the antenna array through the radio frequency channel, or may be expressed as that the radio frequency channel drives the antenna array. One antenna array includes N (where N is an integer greater than or equal to 1) antenna elements. In other words, one radio frequency channel drives N antenna elements, or 1-driving-N for short.

It should be noted that, in the foregoing description, a signal that can be processed by the baseband apparatus is referred to as a baseband signal, and may be a digital baseband signal, a digital intermediate frequency signal, or another signal in embodiments of an implementation. This is not limited in this embodiment of this application. A signal obtained by processing by the radio frequency apparatus or a signal received from an antenna is referred to as a radio frequency signal. As wireless communication technologies develop, the signal obtained by processing by the radio frequency apparatus or the signal received from the antenna may be another signal. This is not limited in this embodiment of this application.

In actual application, a multi-antenna technology (for example, a MIMO technology) may be used to implement the communication system. The multi-antenna technology may support a plurality of users in pairing, that is, may support the plurality of users in transmitting data streams at the same time on a same time-frequency resource. Application of the MIMO technology is used as an example. A radio frequency module may include a plurality of transceivers (TRXs). Correspondingly, each TRX is connected to a power amplifier (PA) in a one-to-one manner. For example, a TRX 1 is connected to a PA 1 in the one-to-one manner. It is assumed that a signal needs to be sent currently. After the TRX performs intermediate radio frequency processing on a data stream, a processed data stream may be input to the PA for power amplification, and then sequentially transmitted to a band-pass filter and the antenna apparatus, so that the data stream is transmitted to a MMO client. A quantity of TRXs included in the radio frequency module determines a pairing capability of a network. Generally, a larger quantity of TRXs in the radio frequency module indicates a stronger pairing capability of the network. To be specific, more users can be supported at the same time in using a same time-frequency resource to transmit data streams.

However, power consumption generated by the plurality of TRXs and the PAs during running is usually relatively high. Especially when a network load is relatively low, actual paired users in the network are few, but all the TRXs and PAs are still used. To be specific, all the TRXs and PAs are in a running state of high power consumption. This results in unnecessary power consumption.

Figure 2:
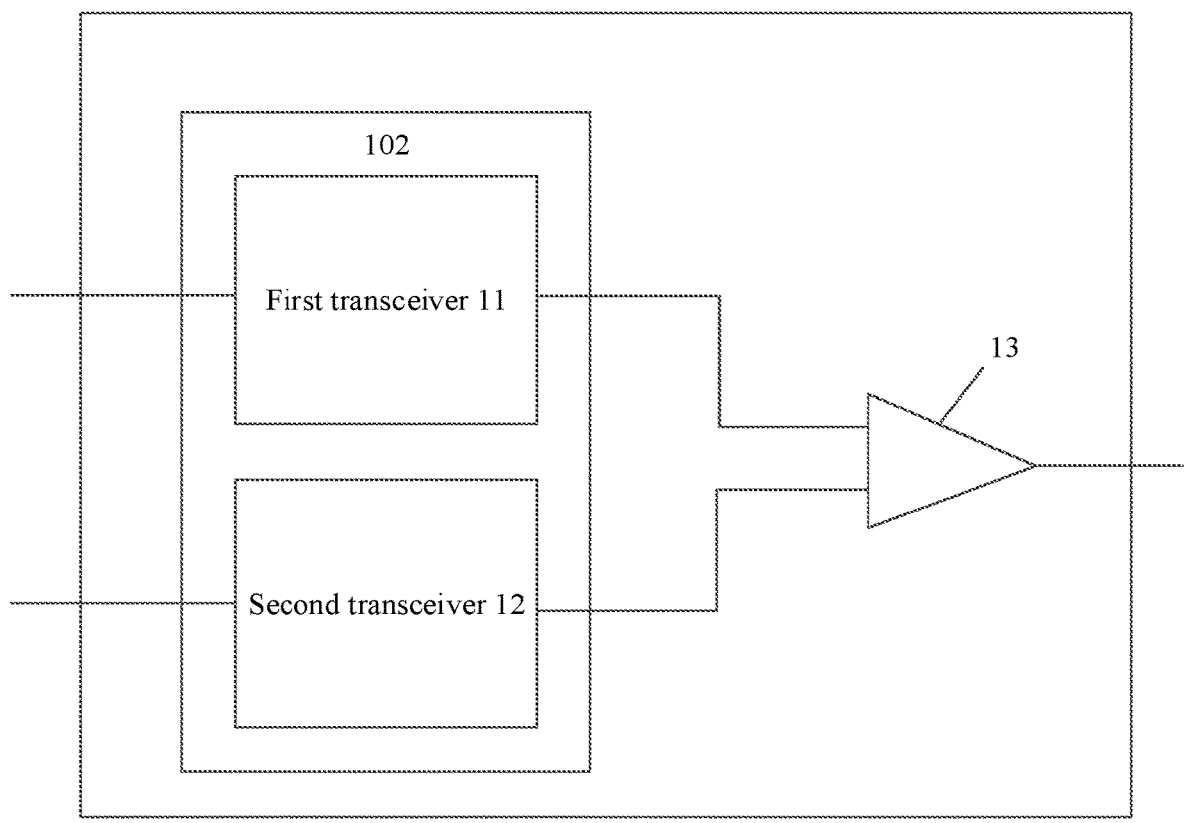
FIG. 2 is a schematic diagram of a structure of an example communication apparatus according to an embodiment of this application.

Therefore, an embodiment of this application provides a communication apparatus, so that when a multi-antenna technology is applied, power consumption of a system can be reduced based on the communication apparatus, to achieve an energy saving effect. Specifically, as shown in FIG. 2, the communication apparatus may be used in the communication system shown in FIG. 1. The communication apparatus may include a first transceiver 11, a second transceiver 12, and a first power amplifier 13. The first transceiver 11 and the second transceiver 12 may be separately connected to the first power amplifier 13.

The connection in this embodiment of this application may be understood as a direct connection (that is, a connection may be implemented without another component in the middle) or an indirect connection (that is, a connection may be implemented by using another component in the middle, for example, a bridge or a switch). It should be noted that when a switch between the transceiver and the power amplifier is turned on, it may also be considered that the transceiver is connected to the power amplifier.

In addition, the transceiver being connected to the power amplifier may further be understood as that, after the transceiver performs radio frequency processing on a baseband signal, an obtained radio frequency signal may be transmitted to the power amplifier. It should be noted that the first transceiver 11 and the second transceiver 12 may be separately connected to the first power amplifier 13, and signals may be transmitted to the power amplifier at the same time by using the first transceiver 11 and the second transceiver 12, or may be transmitted to the power amplifier at different time. For example, at a moment T1, a first signal may be transmitted to the first power amplifier 13 by using the first transceiver 11, and at a moment T2 (unequal to the moment T1), a second signal may be transmitted to the first power amplifier 13 by using the second transceiver 12. Alternatively, when a first signal is transmitted to the first power amplifier 13 by using the first transceiver 11, a second signal is also transmitted to the first power amplifier 13 by using the second transceiver 12.

In this way, when it is determined that a network load is relatively low, a redundant transceiver may end running. Therefore, any transceiver in the communication apparatus may be turned off. For example, the first transceiver 11 or the second transceiver 12 may be turned off. It may be understood that, in a process of implementing the application of the multi-antenna technology based on the communication apparatus, because one of the transceivers in the communication apparatus is turned off, the turned-off transceiver no longer generates power consumption, and power consumption of the entire communication apparatus is reduced. In this way, power consumption of the system can be reduced when the multi-antenna technology is applied, to achieve the energy saving effect. In addition, when an electronic component in the communication apparatus is turned off, one of the transceivers connected to the power amplifier is turned off, and the power amplifier may not be turned off. The power amplifier may still receive a corresponding radio frequency signal from a transceiver that is not turned off, to perform power amplification and send a corresponding radio frequency signal, so that a channel capacity of the system remains basically unchanged. In addition, an antenna gain is not reduced, so that a network signal coverage area is not reduced.

Figure 3:
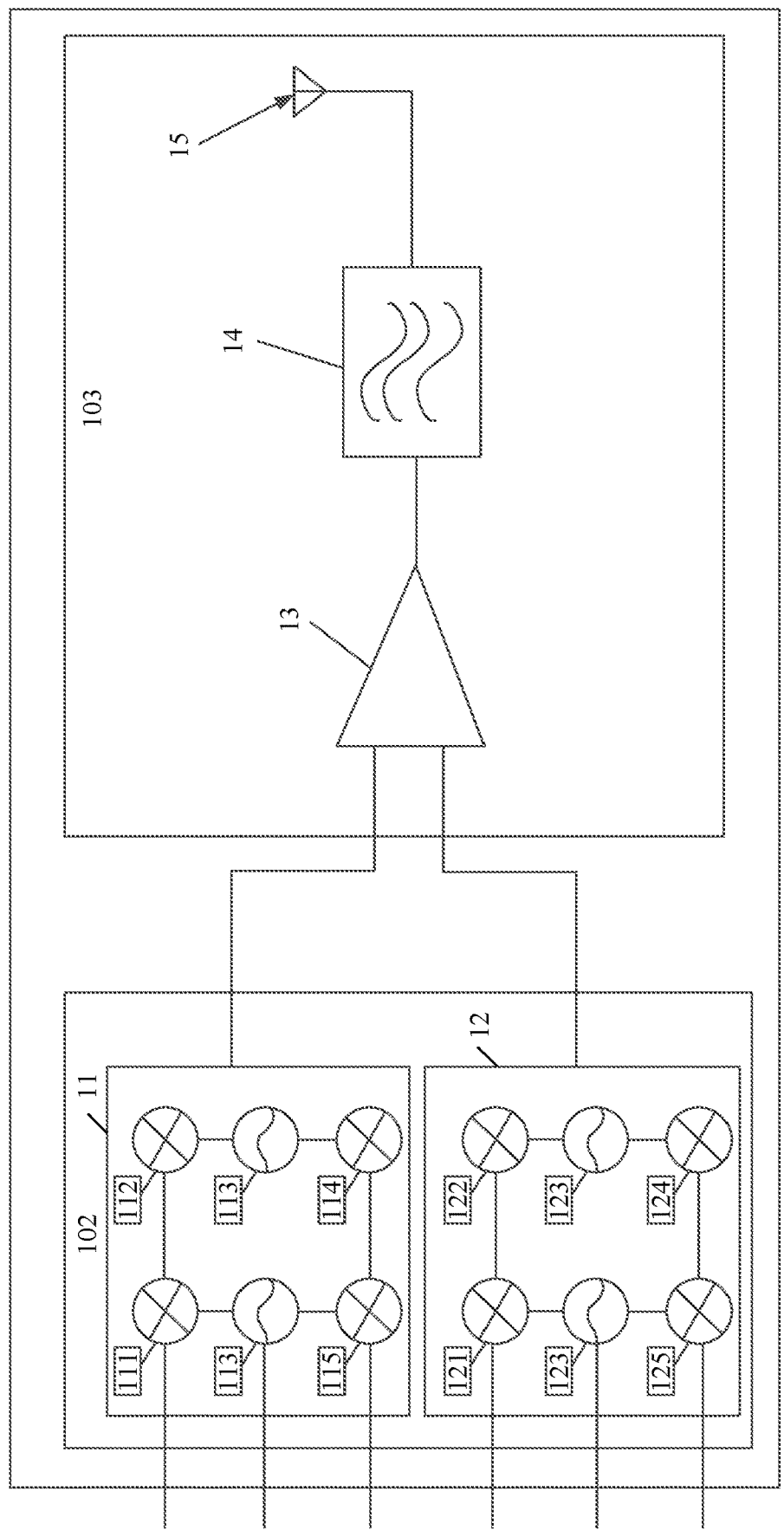
FIG. 3 is a schematic diagram of another example communication system according to an embodiment of this application.

Optionally, when the communication apparatus is used in the communication system shown in FIG. 1, as shown in FIG. 3, the radio frequency apparatus 102 may include the first transceiver 11 and the second transceiver 12, and the antenna apparatus 103 may include the power amplifier 13 and a band-pass filter 14 (certainly, in another implementation and/or embodiment, the band-pass filter 14 and an antenna 15 may not be included.) The first transceiver 11 and the second transceiver 12 are separately connected to the first power amplifier 13, the first power amplifier 13 is connected to the band-pass filter 14, and the band-pass filter 14 is connected to the antenna 15. In embodiments of some possible implementations, the first transceiver 11 may include a modulator 111, an up-converter 112, oscillators 113, a down-converter 114, and a demodulator 115 that are electrically connected. The modulator 111 and the demodulator 115 are connected to one oscillator 113, and the up-converter 112 and the down-converter 114 are connected to one oscillator 113. It should be noted that this is merely an example. The modulator 111 and the demodulator 115 may be connected to different oscillators, and the up-converter 112 and the down-converter 114 may be connected to different oscillators. This is not limited in embodiments of this application. After entering the first transceiver 11, a baseband signal sent by a baseband control unit sequentially passes through the modulator 111, the up-converter 112, the first power amplifier 13, and the band-pass filter 14, and then is sent to the antenna apparatus 103. Correspondingly, an antenna signal sequentially passes through the band-pass filter 14, the first power amplifier 13, the down-converter 114 and the demodulator 115 from the antenna apparatus 103, to form a baseband signal, and the baseband signal is sent to the baseband control unit. Similarly, the second transceiver 12 may include a modulator 121, an up-converter 122, oscillators 123, a down-converter 124, and a demodulator 125 that are electrically connected. The modulator 121 and the demodulator 125 are connected to one oscillator 123, and the up-converter 112 and the down-converter 114 are connected to one oscillator 123. It should be noted that FIG. 3 is merely used as an example for description. In actual application, electronic components in the radio frequency apparatus 102, a quantity of the electronic components, and a connection relationship between the electronic components are not limited thereto.

For the communication system shown in FIG. 1, if it is determined that a current network load is relatively low, the first transceiver 11 in the system may be turned off (certainly, the second transceiver 12 in the system may alternatively be turnoff, and herein, an example in which the first transceiver 11 is turned off is used for description), so that the first transceiver 11 in the system ends running, and the second transceiver 12 continues to run, and cooperates with the first power amplifier 13 to send and receive radio frequency signals. Because the first transceiver 11 in the system ends running, the first transceiver 11 can stop generating energy consumption, so that the power consumption of the system is reduced, to achieve the energy saving effect. In addition, the first power amplifier 13 in the system is not turned off, and may still receive a data stream from the second transceiver 12 for corresponding power amplification and signal sending. Therefore, the channel capacity of the system remains basically unchanged, and the antenna gain is not reduced, so that when the power consumption of the system is reduced, the network signal coverage area and the channel capacity of the system are not reduced.

The following describes the technical solutions in this application.

Figure 4:
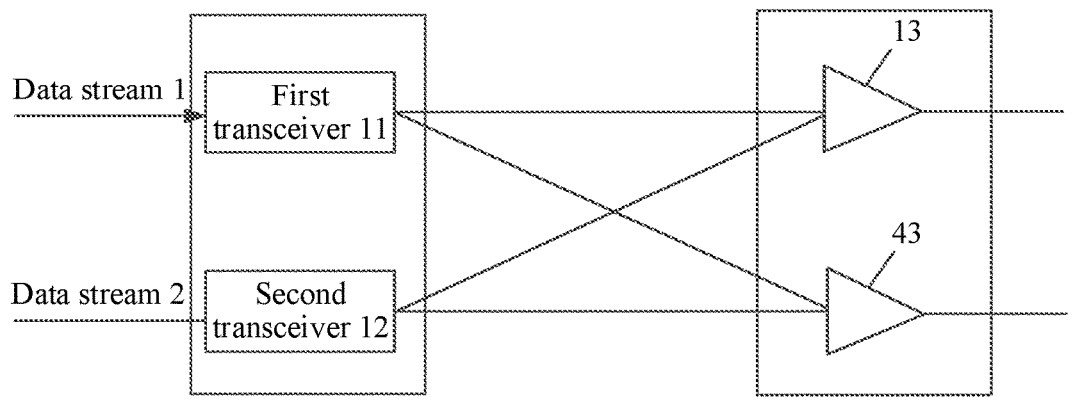
FIG. 4 is a schematic diagram of a structure of a communication apparatus including two power amplifiers according to an embodiment of this application.

FIG. 4 shows a communication apparatus according to an embodiment of this application. When being separately connected to a first power amplifier 13, a first transceiver 11 and a second transceiver 12 included in the communication apparatus may further be separately connected to a second power amplifier 43. The transceivers and the power amplifier shown in FIG. 4 may have same or similar functions as the transceivers and the power amplifier shown in FIG. 2. After the first transceiver 11 performs intermediate radio frequency processing on a data stream 1, a processed data stream may separately enter the first power amplifier 13 and the second power amplifier 43 for power amplification, and is transmitted to a first client (for example, transmitted to user equipment) through an antenna 1 connected to the first power amplifier 13, and transmitted to a second client through an antenna 2 connected to the second power amplifier 43. Similarly, after the second transceiver 12 performs intermediate radio frequency processing on a data stream 2, a processed data stream may separately enter the first power amplifier 13 and the second power amplifier 43 for power amplification, and is transmitted to the first client through the antenna 1 connected to the first power amplifier 13, and transmitted to the second client through the antenna 2 connected to the second power amplifier 43. Further, the first power amplifier 13 may further be connected to a first group of antennas (not shown in FIG. 4), and the first group of antennas includes a first transmit antenna and a first receive antenna. The second power amplifier 43 may further be connected to a second group of antennas (not shown in FIG. 4), and the second group of antennas includes a second transmit antenna and a second receive antenna.

It should be noted that, based on the communication apparatus shown in FIG. 4, a radio frequency signal sent by the antenna 1 or the antenna 2 is a mixed radio frequency signal corresponding to a plurality of data streams. For example, a radio frequency signal sent by the antenna 1 to the first client is a mixed radio frequency signal obtained by integrating the data stream 1 and the data stream 2. In this case, after receiving the mixed radio frequency signal, the first client or the second client may correspondingly demodulate the mixed radio frequency signal, to separately obtain a signal corresponding to the data stream 1 and a signal corresponding to the data stream 2.

In this way, when it is determined that a network load is relatively low, for example, only the first client currently has a requirement of communicating with a system, the second transceiver 12 corresponding to the second client may be turned off. It may be understood that, after the second transceiver 12 is turned off, the second transceiver 12 no longer generates power consumption. Correspondingly, power consumption of the system may be reduced. In addition, the first power amplifier 13 and the second power amplifier 43 still continue to run, so that a network signal coverage area of the system and a channel capacity of the system are not reduced.

Figure 5:
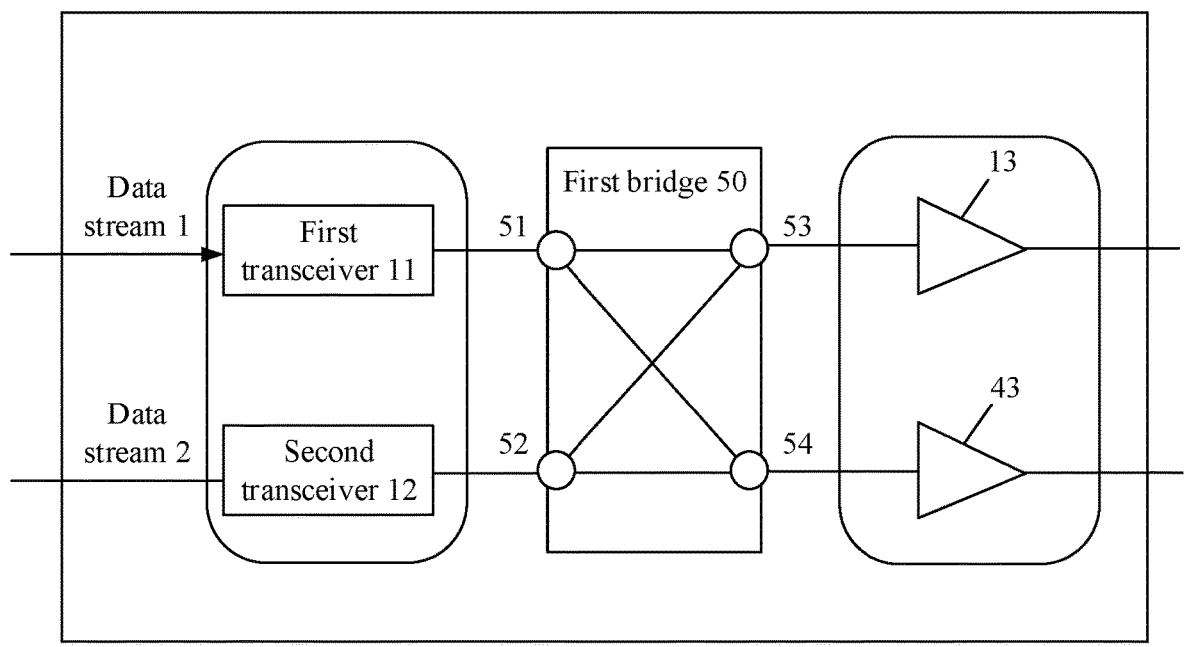
FIG. 5 is a schematic diagram of a structure of an example communication apparatus including a bridge and two transceivers according to an embodiment of this application.

Further, the first transceiver 11 and the second transceiver 12 may be separately connected to the first power amplifier 13 and the second power amplifier 43 through a bridge, as shown in FIG. 5. Specifically, the first transceiver 11 may be connected to a first port 51 of a first bridge 50, and the second transceiver 12 may be connected to a second port 52 of the first bridge 50. A third port 53 of the first bridge 50 may be connected to the first power amplifier 13, and a fourth port 54 of the first bridge 50 may be connected to the second power amplifier 43. The first port 51 of the first bridge 50 may be separately connected to the third port 53 and the fourth port 54 of the first bridge 50, and the second port 52 of the first bridge 50 may be separately connected to the third port 53 and the fourth port 54 of the first bridge 50.

When the first transceiver 11 and the second transceiver 12 run, if the system currently sends communication data to the user equipment (e.g., a client), a data stream received by the first transceiver 11 may enter the bridge through the first port 51 of the first bridge 50, flow into the first power amplifier 13 from the third port 53, and flow into the second power amplifier 43 from the fourth port 54. Similarly, a data stream received by the second transceiver 12 may enter the bridge through the second port 52 of the first bridge 50, flow into the first power amplifier 13 from the third port 53, and flow into the second power amplifier 43 from the fourth port 54. In this case, the first port 51 and the second port 52 of the first bridge 50 are input ports, and the third port 53 and the fourth port 54 of the first bridge 50 are output ports.

However, if the system currently receives communication data sent by the user equipment, a data stream received by the first power amplifier 13 may flow into the first bridge 50 through the third port 53 of the first bridge 50, flow into the first transceiver 11 from the first port 51, and flow into the second transceiver 12 from the second port 52. Similarly, a data stream received by the second power amplifier 43 may flow into the first bridge 50 through the fourth port 54 of the first bridge 50, flow into the first transceiver 11 from the first port 51, and flow into the second transceiver 12 from the second port 52. In this case, the first port 51 and the second port 52 of the first bridge 50 are output ports, and the third port 53 and the fourth port 54 of the first bridge 50 are input ports.

However, when the system determines that a current network load is relatively low or the system is notified that a current network load is relatively low, the first transceiver 11 or the second transceiver 12 may be turned off. A specific to-be-turned-off transceiver may be determined based on a pairing status between the transceiver and the user equipment. For example, if the first transceiver 11 is currently paired with no user equipment, the first transceiver 11 may be turned off, and the second transceiver 12 may continue to perform data processing and transmission for user equipment paired with the second transceiver 12. In this way, when the first transceiver 11 is turned off to implement energy saving, because the first power amplifier 13 and the second power amplifier 43 are not turned off, the channel capacity and the network signal coverage area of the system are not reduced.

An example in which the communication apparatuses shown in FIG. 2 and FIG. 5 each includes two transceivers is used for description. In actual application, the communication apparatus may include N transceivers, where N is an integer greater than or equal to 1. For example, N is 64. In this case, when energy saving of the system is to be implemented, the foregoing process may be performed, where 32 of the 64 transceivers are turned off by using two transceivers as one group, and each of remaining 32 transceivers may be connected to the two power amplifiers, to implement the energy saving of the system. Certainly, a quantity of turned-off transceivers is not limited to 32. For example, 16 or 20 transceivers may alternatively be turned off. When the channel capacity and the network signal coverage area of the system are not reduced, a quantity of turned-off transceivers in a system including 64 transceivers is not greater than 32.

In actual application, if a plurality of transceivers are connected to a same power amplifier through a bridge, when the system sends the communication data to the user equipment, signals output by the plurality of transceivers are mixed in a signal received by each power amplifier. For example, when the first transceiver 11 and the second transceiver run at the same time, radio frequency signals output by the first transceiver 11 and the second transceiver 12 are both transmitted to the first power amplifier 13, so that a radio frequency signal received by the power amplifier is a radio frequency signal obtained by mixing the radio frequency signals output by the plurality of transceivers. Therefore, in this embodiment, specific weighted summation processing may further be performed on a base station signal sent to the transceiver, so that a one-to-one correspondence is established between the transceivers and the power amplifiers. Specifically, a first processor 10 may further be added to the communication apparatus shown in FIG. 5, to obtain a system shown in FIG. 6. In the system, the first processor 10 may be separately connected to the first transceiver 11 and the second transceiver 12. The first processor 10 may perform, by using a first weighting matrix, weighted summation processing on a first baseband signal to be transmitted to the first transceiver 11, to obtain a corresponding third baseband signal, and perform, by using the first weighting matrix, weighted summation processing on a second baseband signal to be transmitted to the second transceiver 12, to obtain a fourth baseband signal. The first weighting matrix is an inverse matrix of a bridge matrix of the first bridge 50. Then, the third baseband signal is output to the first transceiver 11, and the fourth baseband signal is output to the second transceiver 12.

For example, the first weighting matrix may be specifically:

$$\frac{1}{\sqrt{2}}\begin{bmatrix} 1 & -j \\ -j & 1 \end{bmatrix},$$

where j is a complex number.

The bridge matrix of the first bridge 50 is an inverse matrix of the first weighting matrix, and is:

$$\begin{bmatrix} \frac{1}{\sqrt{2}} & \frac{j}{\sqrt{2}} \\ \frac{j}{\sqrt{2}} & \frac{1}{\sqrt{2}} \end{bmatrix}.$$

$X^0$ is used to represent the first baseband signal, $X^1$ is used to represent the second baseband signal, and $Y^0$ and $Y^1$ are respectively used to represent two channels of different radio frequency signals output by the first bridge 50. In this case, the following is obtained:

$$\begin{bmatrix} Y^0 \\ Y^1 \end{bmatrix} = \frac{1}{\sqrt{2}} \begin{bmatrix} 1 & -j \\ -j & 1 \end{bmatrix} \begin{bmatrix} \frac{1}{\sqrt{2}} & \frac{j}{\sqrt{2}} \\ \frac{j}{\sqrt{2}} & \frac{1}{\sqrt{2}} \end{bmatrix} \begin{bmatrix} X^0 \\ X^1 \end{bmatrix} = \begin{bmatrix} X^0 \\ X^1 \end{bmatrix}.$$

It can be learned that, after the first processor performs weighted summation processing on the first baseband signal and the second baseband signal, a signal received by each power amplifier is a radio frequency signal output by a single transceiver, and may not be a mixture of a plurality of radio frequency signals. Therefore, consistency of input and output signals of each channel of signals is implemented.

Similarly, when the system receives a signal sent by the user equipment, a processor (for ease of differentiation from the first processor 10, hereinafter referred to as a fourth processor) may further be configured to perform weighted summation processing on the signal output by the transceiver. Specifically, the system may include the fourth processor. Similarly, the fourth processor is separately connected to the first transceiver 11 and the second transceiver 12, and may perform, by using a fourth weighting matrix, weighted summation processing on a first baseband signal output by the first transceiver 11, to obtain a corresponding third baseband signal, and perform, by using the fourth weighting matrix, weighted summation processing on a second baseband signal output by the second transceiver 12, to obtain a corresponding fourth baseband signal. The fourth weighting matrix is an inverse matrix of a bridge matrix of the first bridge 50. In actual application, the first processor 10 and the fourth processor may be a same processor.

Optionally, in this embodiment of this application, the processor may be coupled to a memory, and execute a program or instructions in the memory, to complete the weighted summation processing. Alternatively, a memory may store information about the weighting matrix, and the processor may read the information about the weighting matrix stored in the memory, to complete the weighted summation processing. In embodiments of some possible implementations, the first processor may be specifically in a building baseband unit (BBU), and a system integrating the BBU may be a base station or the like. Optionally, the BBU further includes a memory. Alternatively, the first processor may be located in a radio frequency apparatus 102. Optionally, the radio frequency apparatus 102 further includes a memory.

For a system including 64 transceivers, the system may be switched, by using the foregoing embodiment of the implementation, from a state in which the 64 transceivers run to a state in which 32 transceivers run. However, in some other possible embodiments of implementations, the system may further be switched from the state in which the 64 transceivers run to a state in which 16 transceivers run. Specifically, the following uses an example in which a system includes four transceivers for description. Refer to a system shown in FIG. 7.

Figure 7:
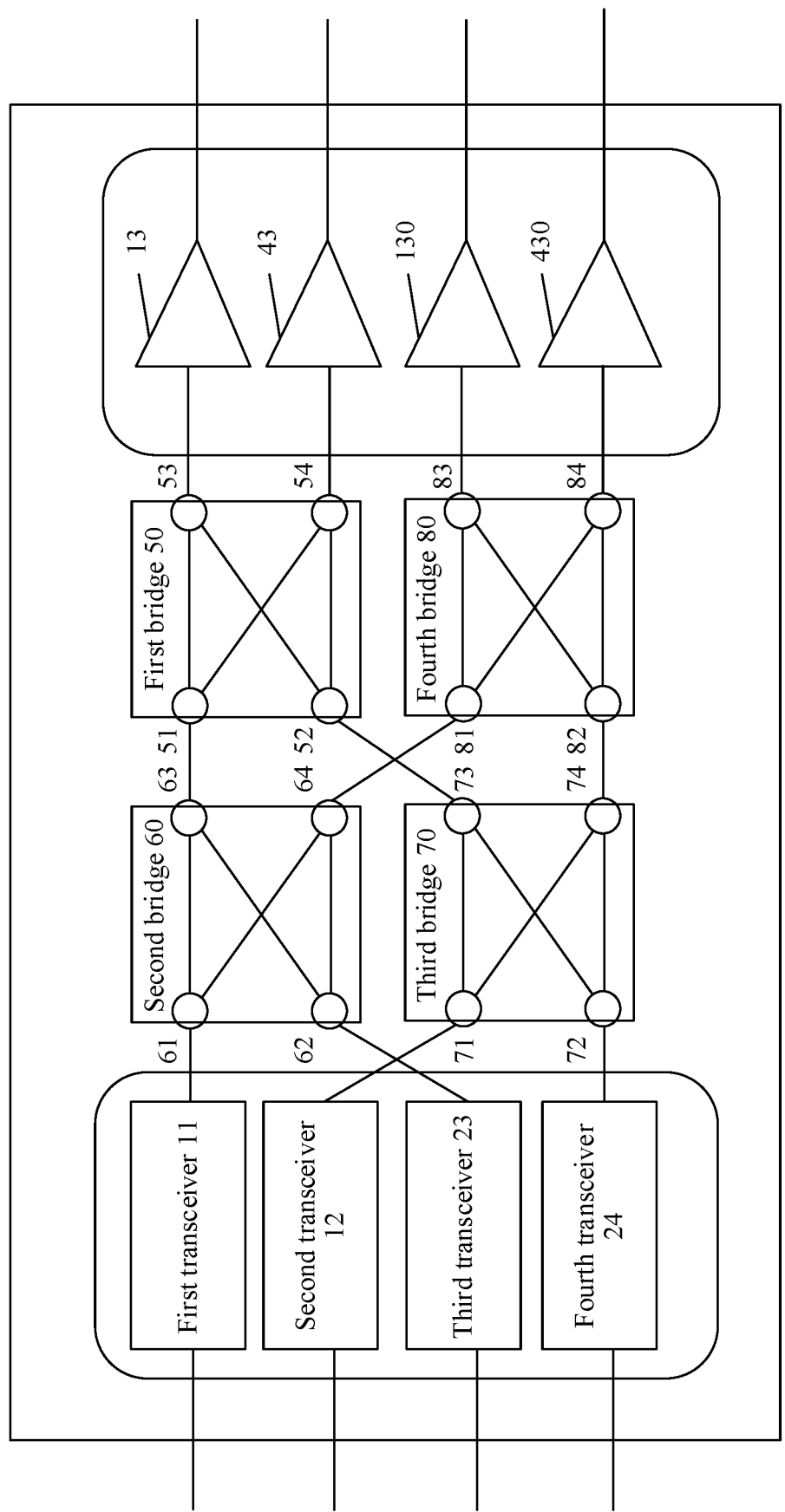
FIG. 7 is a schematic diagram of a structure of an example communication apparatus including four bridges according to an embodiment of this application.

The communication apparatus shown in FIG. 7 includes four transceivers, which are respectively a first transceiver 11, a second transceiver 12, a third transceiver 23, and a fourth transceiver 24; further includes four power amplifiers, which are respectively a first power amplifier 13, a second power amplifier 43, a third power amplifier 130, and a fourth power amplifier 430; and further includes four bridges, which are respectively a bridge 50, a bridge 60, a bridge 70, and a bridge 80. As shown in FIG. 7, a mutual connection relationship between the electronic components is as follows: The first transceiver 11 is connected to a first port 61 of the second bridge 60, and a third port 63 of the second bridge 60 is connected to a first port 51 of the first bridge 50. The second transceiver 12 is connected to a first port 71 of the third bridge 70, and a third port 73 of the third bridge 70 is connected to a second port 52 of the first bridge 50. The third transceiver 23 is connected to a second port 62 of the second bridge 60, and a fourth port 64 of the second bridge 60 is connected to a first port 81 of the fourth bridge 80. The fourth transceiver 24 is connected to a second port 72 of the third bridge 70, and a fourth port 74 of the third bridge 70 is connected to a second port 82 of the fourth bridge 80. A third port 83 of the fourth bridge 80 is connected to the third power amplifier 130, and a fourth port 84 of the fourth bridge 80 is connected to the fourth power amplifier 430. The first port 61 of the second bridge 60 is separately connected to the third port 63 of the second bridge 60 and the fourth port 64 of the second bridge 60, and the second port 62 of the second bridge 60 is separately connected to the third port 63 of the second bridge 60 and the fourth port 64 of the second bridge 60. The first port 71 of the third bridge 70 is separately connected to the third port 73 of the third bridge 70 and the fourth port 74 of the third bridge 70, and the second port 72 of the third bridge 70 is separately connected to the third port 73 of the third bridge 70 and the fourth port 74 of the third bridge 70. The first port 81 of the fourth bridge 80 is separately connected to the third port 83 of the fourth bridge 80 and the fourth port 84 of the fourth bridge 80, and the second port 82 of the fourth bridge 80 is separately connected to the third port 83 of the fourth bridge 80 and the fourth port 84 of the fourth bridge 80.

Further, the first power amplifier 13 may further be connected to a first group of antennas (not shown in FIG. 7). The first group of antennas includes a first transmit antenna and a first receive antenna. The second power amplifier 43 may further be connected to a second group of antennas (not shown in FIG. 7). The second group of antennas includes a second transmit antenna and a second receive antenna. The third power amplifier 130 may further be connected to a third group of antennas (not shown in FIG. 7). The third group of antennas includes a third transmit antenna and a third receive antenna. The fourth power amplifier 430 may further be connected to a fourth group of antennas (not shown in FIG. 7). The fourth group of antennas includes a fourth transmit antenna and a fourth receive antenna.

When all the transceivers in the system are in a running state, if the system currently sends communication data to user equipment, the third transceiver 23 is used as an example (where the other transceivers are similar), a data stream received by the third transceiver 23 may flow into the second bridge 60 through the second port 62 of the second bridge 60. Because the second port 62 is separately connected to the third port 63 and the fourth port 64, the data stream may reach the third port 63 and the fourth port 64 from the second port. Then, the third port 63 is connected to the first port 51 of the first bridge 50, and the first port 51 is separately connected to a third port 53 and a fourth port 54. Therefore, the data stream at the third port 63 may flow into the first power amplifier 13 sequentially through the first port 51 and the third port 53, and flow into the second power amplifier 43 sequentially through the first port 51 and the fourth port 54. The fourth port 64 is connected to the first port 81 of the fourth bridge 80, and the first port 81 is separately connected to the third port 83 and the fourth port 84. Therefore, the data stream at the fourth port 64 may further flow into the third power amplifier 130 sequentially through the first port 81 and the third port 83, and flow into the fourth power amplifier 430 sequentially through the first port 81 and the fourth port 84. In other words, a data stream received by each transceiver may finally separately flow into the four power amplifiers. Correspondingly, a data stream received by each power amplifier is a mixed data stream obtained by integrating the data streams received by the four transceivers.

In this case, the first port 51, the second port 52, the first port 61, the second port 62, the first port 71, the second port 72, the first port 81, and the second port 82 are all input ports for the data stream. The third port 53, the fourth port 54, the third port 63, the fourth port 64, the third port 73, the fourth port 74, the third port 83, and the fourth port 84 are all output ports for the data stream.

On the contrary, if the system currently receives communication data sent by the user equipment, for example, the first power amplifier 13 still receives the communication data from the user equipment (where the other transceivers are similar), the data stream received by the first power amplifier 13 may flow into the first bridge through the third port 53 of the first bridge 50, flow into the first transceiver 11 sequentially through the first port 51, the third port 63, and the first port 61, flow into the third transceiver 23 sequentially through the first port 51, the third port 63, and the second port 62, flow into the second transceiver 12 sequentially through the second port 52, the third port 73, and the first port 71, and flow into the fourth transceiver 24 sequentially through the second port 52, the third port 73, and the second port 72.

In this case, the first port 51, the second port 52, the first port 61, the second port 62, the first port 71, the second port 72, the first port 81, and the second port 82 are all output ports for the data stream. The third port 53, the fourth port 54, the third port 63, the fourth port 64, the third port 73, the fourth port 74, the third port 83, and the fourth port 84 are all input ports for the data stream.

In this way, when the system determines that a network load is relatively low or the system is notified that a network load is relatively low, a transceiver with which no user equipment is currently paired may be turned off. For example, it is assumed that only the first transceiver 11 is currently paired with the user equipment. In this case, the second transceiver 12, the third transceiver 23, and the fourth transceiver 24 may be turned off. It should be noted that, when energy saving of the system is implemented because the second transceiver 12, the third transceiver 23, and the fourth transceiver 24 are turned off, a data stream received by the first transceiver 11 may separately flow into the four power amplifiers, and therefore is sent by using each power amplifiers and a corresponding antenna apparatus, so that a channel capacity and a network signal coverage area of the system are not reduced.

In actual application, if the system includes 64 transceivers, 48 of the 64 transceivers may be turned off by using the foregoing embodiment of an implementation, to switch the system from a state in which the 64 transceivers run to a state in which 16 transceivers run. Certainly, a quantity of turned-off transceivers in the system may alternatively be determined by the system based on a requirement in the actual application. For example, only 20 or 32 transceivers may alternatively be turned off. When the channel capacity and the network signal coverage area of the system are not reduced, the quantity of turned-off transceivers in the system including the 64 transceivers is not greater than 48.

Figure 8:
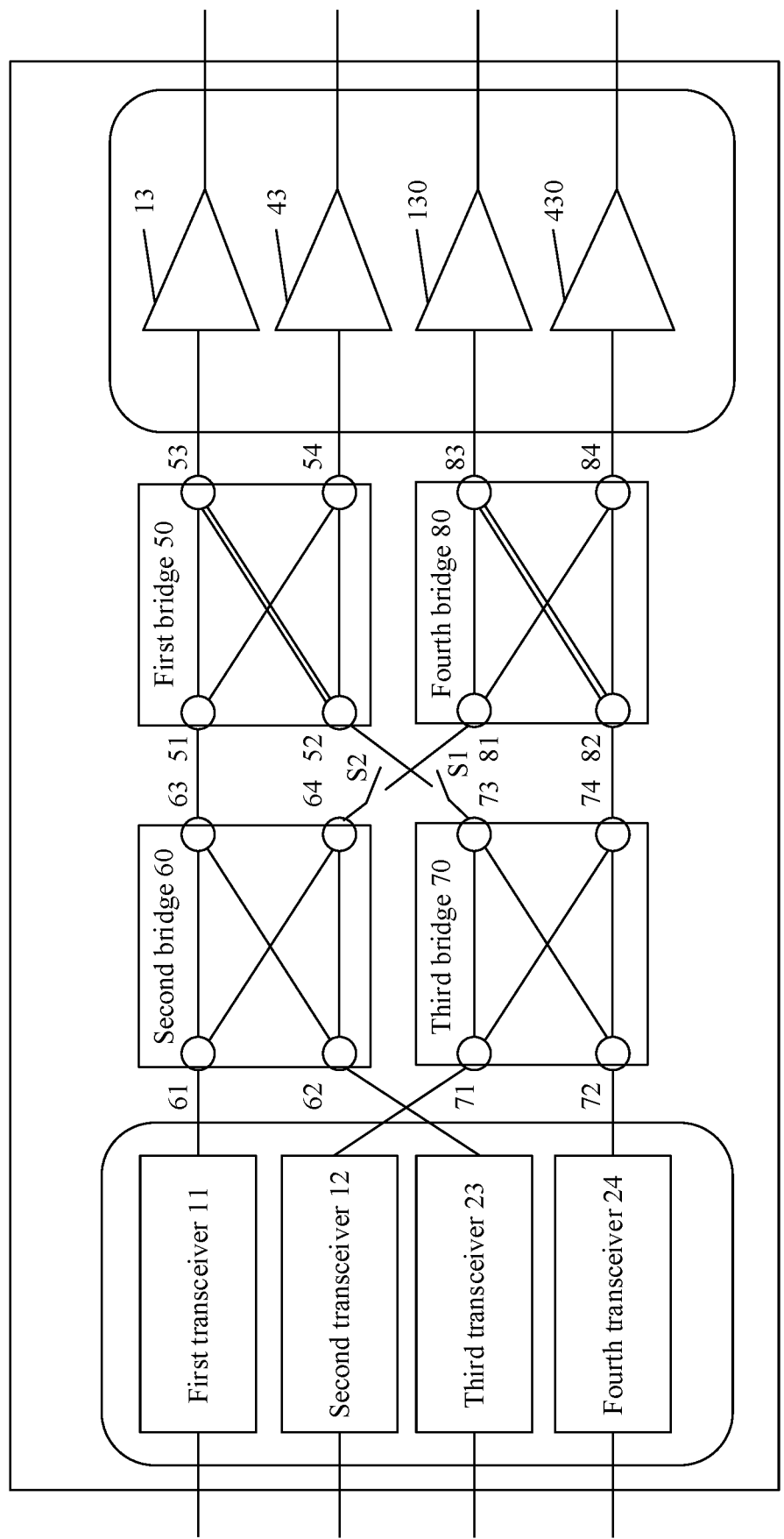
FIG. 8 is a schematic diagram in which a switch is disposed in four bridges according to an embodiment of this application.

In embodiments of some possible implementations, when some transceivers in the system shown in FIG. 7 are turned off without reducing the channel capacity and the network signal coverage area of the system, the system may further use a structure shown in FIG. 8. As shown in FIG. 8, the system may further include a first switch S1 and a second switch S2. The third port 73 of the third bridge 70 is connected to one end of the first switch S1, and the other end of the first switch S1 is connected to the second port of the first bridge 50. In addition, the fourth port 64 of the second bridge 60 is connected to one end of the second switch S2, and the other end of the second switch S2 may be connected to the first port 81 of the fourth bridge 80, as shown in FIG. 8. In this way, when the first transceiver 11 and the fourth transceiver 24 in FIG. 8 are turned off, the first switch S1 and the second switch S2 may be turned off. In this case, when the system sends the communication data to the user equipment, the data stream received by the second transceiver 12 may flow into the first power amplifier 13 for power amplification and subsequent radio frequency signal sending sequentially through the second port 62 and the third port 63 of the second bridge 60, the first port 51, and the third port 53, and also flow into the second power amplifier 43 for power amplification and subsequent radio frequency signal sending sequentially through the second port 62 and the third port 63 of the second bridge 60, the first port 51, and the fourth port 54. In other words, a data stream received by a transceiver that is not turned off may separately flow into two power amplifiers for power amplification and signal output. Similar to that in the second transceiver 12, the data stream received by the third transceiver 23 may separately flow into the third power amplifier 130 and the fourth power amplifier 430. It should be noted that, even if the first transceiver 11 and the fourth transceiver 24 are turned off, each power amplifier in the system shown in FIG. 8 continues to run. Therefore, the channel capacity and the network signal coverage area of the system are not reduced.

Certainly, for the system shown in FIG. 8, when the transceiver needs to be turned off, the second transceiver 12 and the third transceiver 23 may alternatively be turned off, and the first switch S1 and the second switch S2 may be turned off. This is similar to turning off the first transceiver 11 and the fourth transceiver 24. Details are not described herein again.

Figure 6:
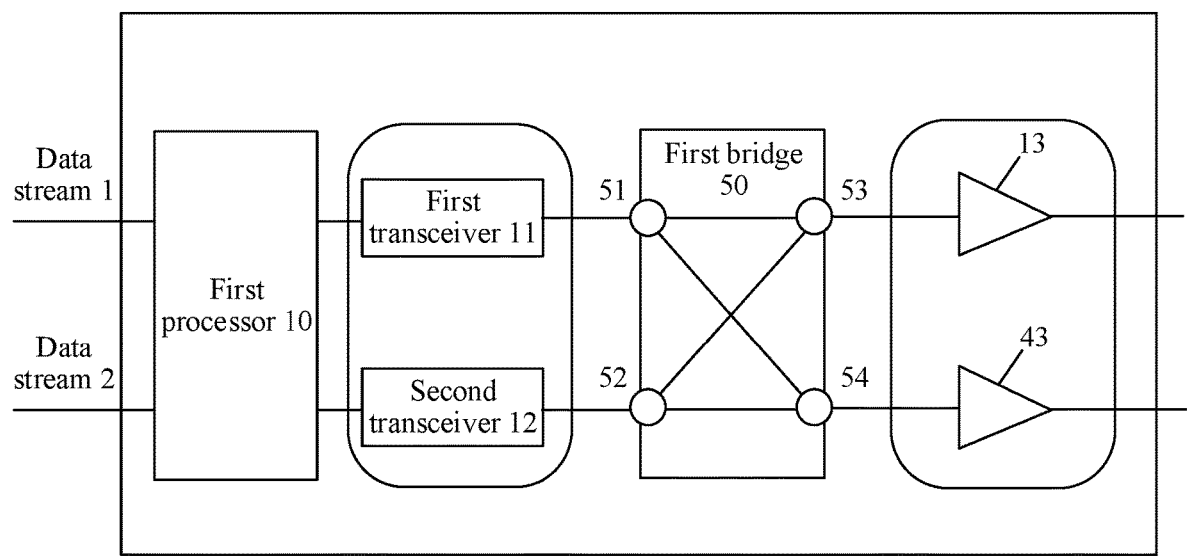
FIG. 6 is a schematic diagram of a structure of an example communication apparatus including a first processor according to an embodiment of this application.
Figure 9:
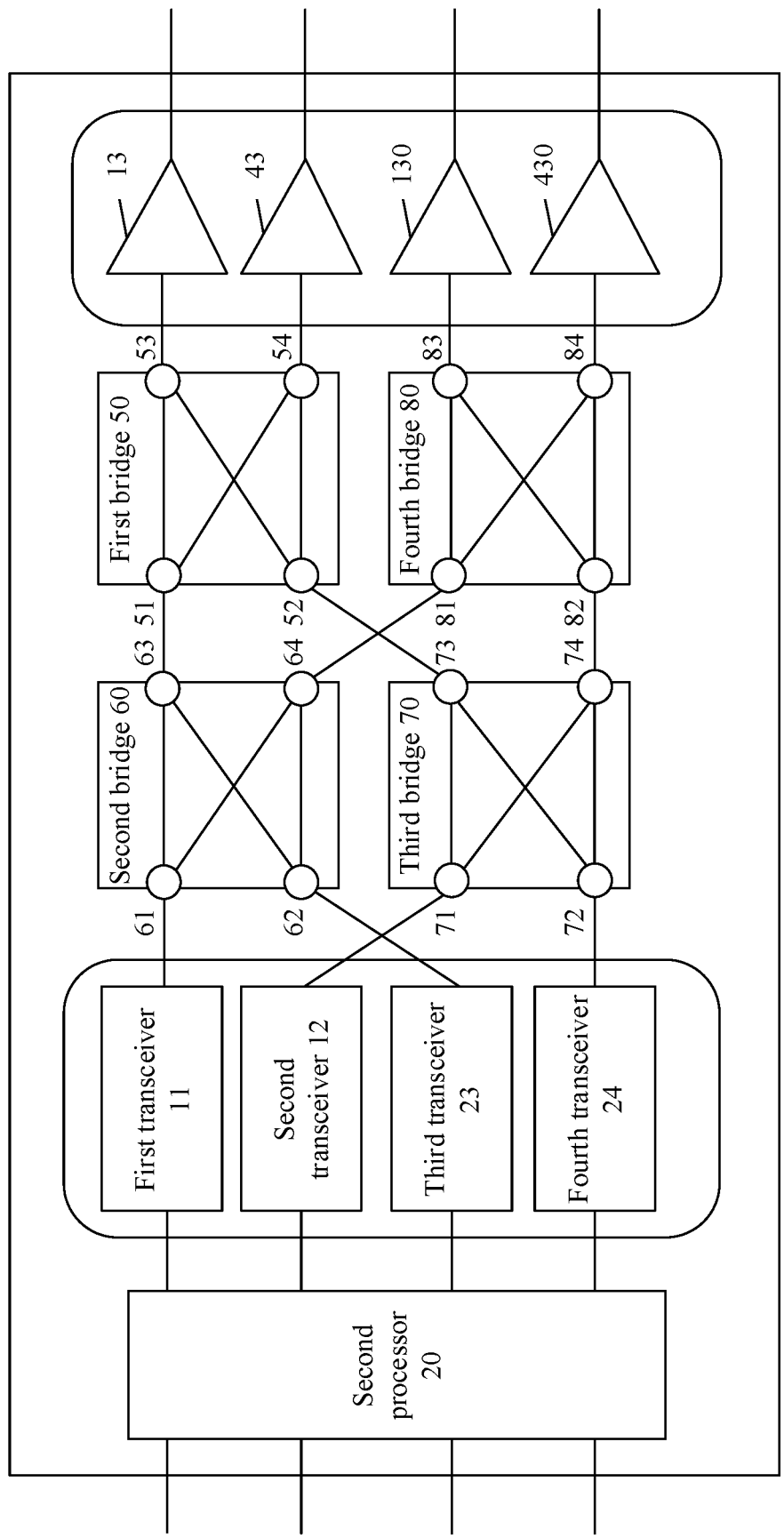
FIG. 9 is a schematic diagram of a structure of an example communication apparatus including a second processor according to an embodiment of this application.

Further, similar to that in the communication apparatus including the first processor 10 shown in FIG. 6, f a second processor 20 may further be added to the communication apparatus shown in FIG. 7 or FIG. 8, so that phases of input and output signals of each channel of signals are consistent. Specifically, in an embodiment of a possible implementation, a communication apparatus including the second processor 20 may be shown in FIG. 9. In the communication apparatus shown in FIG. 9, the second processor 20 may be separately connected to the first transceiver 11, the second transceiver 12, the third transceiver 23, and the fourth transceiver 24. When the system needs to send the communication data to the user equipment, the second processor 20 may perform, by using a second weighting matrix, weighted summation processing on a first baseband signal that needs to be transmitted to the first transceiver 11, to obtain a corresponding fifth baseband signal, and the obtained fifth baseband signal is output to the first transceiver 11. The second processor 20 may perform, by using the second weighting matrix, weighted summation processing on a second baseband signal that needs to be transmitted to the second transceiver 12, to obtain a corresponding sixth baseband signal, and the obtained sixth baseband signal is output to the second transceiver 12. The second processor 20 may perform, by using the second weighting matrix, weighted summation processing on a third baseband signal that needs to be transmitted to the third transceiver 23, to obtain a corresponding seventh baseband signal, and the obtained seventh baseband signal is output to the third transceiver 23. The second processor 20 may perform, by using the second weighting matrix, weighted summation processing on a fourth baseband signal that needs to be transmitted to the fourth transceiver 24, to obtain a corresponding eighth baseband signal, and the obtained eighth baseband signal is output to the fourth transceiver 24. The second weighting matrix is an inverse matrix of a third weighting matrix, and the third weighting matrix is a combination bridge matrix obtained by determining based on a bridge matrix of the first bridge 50, a bridge matrix of the second bridge 60, a bridge matrix of the third bridge 70, a bridge matrix of the fourth bridge 80, and a connection relationship between the bridges.

For example, the bridge matrices of the first bridge 50, the second bridge 60, the third bridge 70, and the fourth bridge 80 are sequentially:

$$\begin{bmatrix} W_{11} & W_{13} \\ W_{12} & W_{14} \end{bmatrix}, \begin{bmatrix} W_{21} & W_{23} \\ W_{22} & W_{24} \end{bmatrix}, \begin{bmatrix} W_{31} & W_{33} \\ W_{32} & W_{34} \end{bmatrix}, \text{ and } \begin{bmatrix} W_{41} & W_{43} \\ W_{42} & W_{44} \end{bmatrix}.$$

In this case, the combination bridge matrix (namely, the third weighting matrix) determined based on the bridge matrices of the four bridges and a connection between the bridges may be $$\begin{bmatrix} W_{21} & 0 & W_{23} & 0 \\ W_{22} & 0 & W_{24} & 0 \\ 0 & W_{31} & 0 & W_{33} \\ 0 & W_{32} & 0 & W_{34} \end{bmatrix} \begin{bmatrix} W_{11} & W_{13} & 0 & 0 \\ W_{12} & W_{14} & 0 & 0 \\ 0 & 0 & W_{41} & W_{43} \\ 0 & 0 & W_{42} & W_{44} \end{bmatrix}$$

$$\begin{bmatrix} W_{21}W_{11} & W_{21}W_{13} & W_{23}W_{41} & W_{23}W_{43} \\ W_{22}W_{11} & W_{22}W_{13} & W_{24}W_{41} & W_{24}W_{43} \\ W_{31}W_{12} & W_{31}W_{14} & W_{33}W_{42} & W_{33}W_{44} \\ W_{32}W_{12} & W_{32}W_{14} & W_{34}W_{42} & W_{34}W_{44} \end{bmatrix}.$$

However, the second weighting matrix is the inverse matrix of the third weighting matrix.

In this embodiment, after the second processor performs weighted summation processing on the first baseband signal to the fourth baseband signal, a signal received by each power amplifier is a radio frequency signal output by a single transceiver, and may not be a mixture of a plurality of radio frequency signals. Therefore, consistency of input and output signals of each channel of signals is implemented.

Similarly, when the system receives a signal sent by the user equipment, a processor (for ease of differentiation from the second processor 20, hereinafter referred to as a fifth processor) may further be configured to perform weighted summation processing on a signal output by the transceiver. Specifically, the system may include the fifth processor. Similarly, the fifth processor is separately connected to the first transceiver 11, the second transceiver 12, the third transceiver 23, and the fourth transceiver 24, and by using a fifth weighting matrix, may perform weighted summation processing on a first baseband signal output by the first transceiver 11, to obtain a corresponding fifth baseband signal, perform weighted summation processing on a second baseband signal output by the second transceiver 12, to obtain a corresponding sixth baseband signal, perform weighted summation processing on a third baseband signal output by the third transceiver 23, to obtain a corresponding seventh baseband signal, and perform weighted summation processing on a fourth baseband signal output by the fourth transceiver 24, to obtain a corresponding eighth baseband signal. The fifth weighting matrix is an inverse matrix of a sixth weighting matrix, and the sixth weighting matrix is a combination bridge matrix obtained by determining based on the bridge matrix of the first bridge 50, the bridge matrix of the second bridge 60, the bridge matrix of the third bridge 70, the bridge matrix of the fourth bridge 80, and the connection relationship between the bridges.

In the systems shown in FIG. 5 to FIG. 9, the transceiver is connected to the power amplifier through the bridge. In embodiments of some other possible implementations, the transceiver may alternatively be connected to the power amplifier through a switch. Specifically, in an example, the first transceiver 11 may be connected to the first power amplifier 13, and the second transceiver 12 may be connected to the first power amplifier 13 through a third switch. In this way, when the second transceiver 12 needs to be turned off to implement energy saving of the system, the third switch may be turned on, so that the second transceiver 12 is connected to the first power amplifier 13. In this way, the data stream received by the second transceiver 12 may flow into the first power amplifier 13, so that the first power amplifier 13 can continue to run and complete sending the channel of signals, without reducing the channel capacity and the network signal coverage area of the system.

Figure 10:
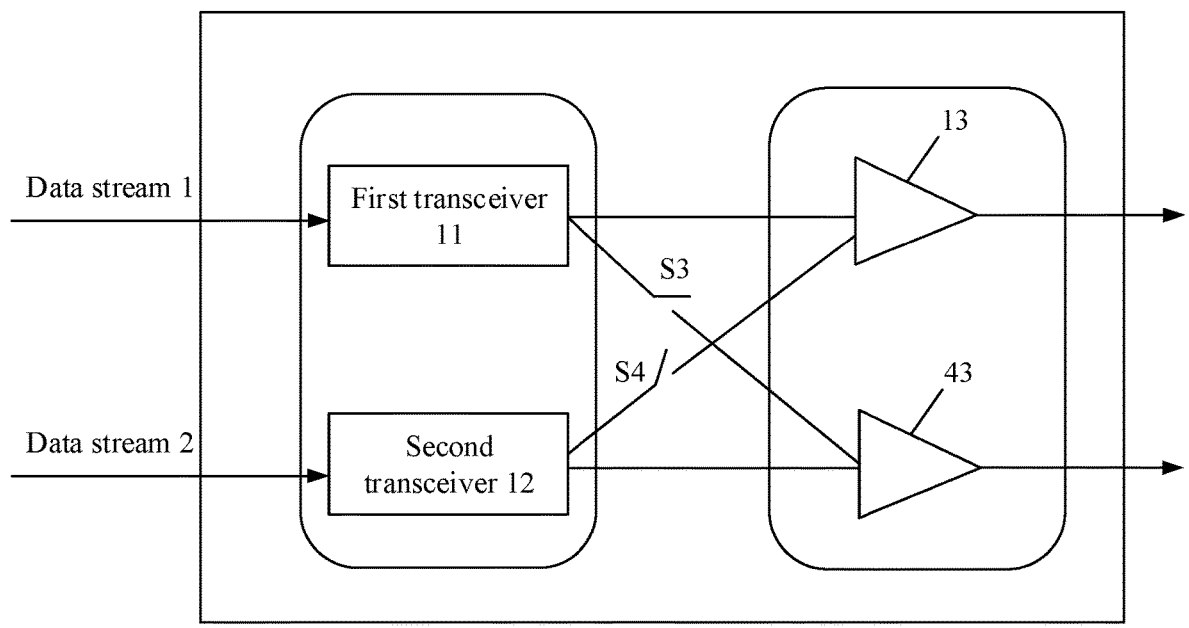
FIG. 10 is a schematic diagram in which a switch is disposed between a transceiver and a power amplifier according to an embodiment of this application.

For ease of understanding, the following uses an example to describe an embodiment of a specific implementation process in which the transceiver is connected to the power amplifier through the switch. For a communication apparatus shown in FIG. 10 (for example, a system sends data), transceivers and power amplifiers included in the communication apparatus have same or similar functions as the transceivers and the power amplifiers in the communication apparatuses shown in FIG. 4 to FIG. 9. A first transceiver 11 is connected to a first power amplifier 13, and the first transceiver 11 is connected to a second power amplifier 43 through a switch S3. A second transceiver 12 is connected to the second power amplifier 43, and the second transceiver 12 is connected to the first power amplifier 13 through a switch S4. Based on the structure shown in FIG. 10, generally, when the first transceiver 11 and the second transceiver 12 run, the switch S3 and the switch S4 may be turned off. In this case, the first transceiver 11 may send a radio frequency signal only to the first power amplifier 13, and the second transceiver 12 may send a radio frequency signal only to the second power amplifier 43. When power consumption of the system needs to be reduced, the first transceiver 11 may be turned off, and the switch S4 is turned on. In this way, the second transceiver 12 may be connected to the first power amplifier 13 and the second power amplifier 43 at the same time, so that when energy saving of the system is implemented, a channel capacity and a network signal coverage area of the system are not reduced. Similarly, when the second transceiver 12 is turned off, the switch S3 may be turned on. In this way, the first transceiver 11 may be connected to the first power amplifier 13 and the second power amplifier 43 at the same time.

With reference to the description of any one of FIG. 2 to FIG. 10, embodiments of this application provide the following communication apparatuses.

An embodiment of this application provides a communication apparatus. The communication apparatus includes a transceiver, a bridge, and a power amplifier. The communication apparatus may be an RRU, a radio frequency unit (RFU), or another apparatus that can complete conversion between a digital signal or an intermediate frequency signal and a radio frequency signal.

An embodiment of this application provides a communication apparatus. The communication apparatus includes a transceiver, a bridge, a power amplifier, and an antenna apparatus 103. The communication apparatus may be an AAU or another apparatus that can convert a digital signal or an intermediate frequency signal into a radio frequency signal and transmit the radio frequency signal to the air.

In this specification, it should be noted that:

The terms "first", "second", and the like in this application are merely used to distinguish between different objects, and "first" and "second" do not limit an actual sequence or functions of objects modified by "first" and "second". For example, "first" and "second" in a "first antenna array" and a "second antenna array" are merely used to indicate that the "first antenna array" and a "second antenna array" respectively correspond to a first radio frequency channel and a second radio frequency channel, and "first" and "second" do not limit an actual sequence or functions of the "first antenna array" and the "second antenna array".

Expressions such as "example", "for example", "such as", "in some possible embodiments", and "a design" in this application are merely used to represent examples, instances, or descriptions. Any embodiment or design scheme described as an "example", "for example", "such as", "in some possible embodiments", and "a design" in embodiments of this application should not be explained as being more preferred or having more advantages than another embodiment or design scheme. Exactly, using these words is intended to present a related concept in a specific manner.

The term "and/or" in this application describes merely an association for describing associated objects and represents that three relationships may exist. For example, A and/or B may represent the following three cases: Only A exists, both A and B exist, and only B exists. In addition, the character "/" in this application generally indicates an "or" relationship between objects before and after the character "/", unless otherwise specified.

The term "a plurality of" in this application may be two, three, or more, and "more than" and "less than" include modified numbers.

The processor in this application may include but is not limited to at least one of the following computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to constitute a semiconductor chip. For example, the processor and another circuit (for example, an encoding/decoding circuit, a hardware acceleration circuit, or various buses and interface circuits) may constitute a system-on-a-chip (SoC). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a programmable logic device (PLD), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

In this application, various objects that may appear, such as various devices/network elements/systems/apparatuses/signals/operations/components, are assigned names. It may be understood that these specific names constitute no limitation on related objects. The assigned names may be changed with factors such as scenarios, context, or use habits. Understanding of technical meanings of technical terms in this application should be mainly determined based on functions and technical effects embodied/performed by the technical terms in the technical solutions.

In embodiments provided in this application, it should be understood that the disclosed system or apparatus may be implemented in other manners. For example, the foregoing apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, mechanical, or another form.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, comprising:
a first transceiver and a second transceiver separately connected to a first power amplifier; and
one or more bridges, wherein the first transceiver and the second transceiver are connected to the first power amplifier through the one or more bridges;
wherein the one or more bridges comprise a first bridge;
the first transceiver is connected to a first port of the first bridge;
the second transceiver is connected to a second port of the first bridge;
a third port of the first bridge is connected to the first power amplifier;
a fourth port of the first bridge is connected to a second power amplifier; and
the first port of the first bridge is separately connected to the third port of the first bridge and the fourth port of the first bridge, and the second port of the first bridge is separately connected to the third port of the first bridge and the fourth port of the first bridge.

2. The communication apparatus according to claim 1, wherein the communication apparatus further comprises a first processor configured to separately perform weighted summation processing on a first baseband signal and a second baseband signal based on a first weighting matrix, to obtain a third baseband signal and a fourth baseband signal, wherein the third baseband signal is output to the first transceiver, the fourth baseband signal is output to the second transceiver, and the first weighting matrix is an inverse matrix of a bridge matrix of the first bridge.

3. The communication apparatus according to claim 1, wherein the communication apparatus further comprises a third transceiver, a fourth transceiver, a third power amplifier, and a fourth power amplifier, and the one or more bridges further comprise a second bridge, a third bridge, and a fourth bridge;
the first transceiver is connected to a first port of the second bridge, and a third port of the second bridge is connected to the first port of the first bridge;
the second transceiver is connected to a first port of the third bridge, and a third port of the third bridge is connected to the second port of the first bridge;
the third transceiver is connected to a second port of the second bridge, and a fourth port of the second bridge is connected to a first port of the fourth bridge;
the fourth transceiver is connected to a second port of the third bridge, and a fourth port of the third bridge is connected to a second port of the fourth bridge;
a third port of the fourth bridge is connected to the third power amplifier, and a fourth port of the fourth bridge is connected to the fourth power amplifier;
the first port of the second bridge is separately connected to the third port of the second bridge and the fourth port of the second bridge, and the second port of the second bridge is separately connected to the third port of the second bridge and the fourth port of the second bridge;
the first port of the third bridge is separately connected to the third port of the third bridge and the fourth port of the third bridge, and the second port of the third bridge is separately connected to the third port of the third bridge and the fourth port of the third bridge; and
the first port of the fourth bridge is separately connected to the third port of the fourth bridge and the fourth port of the fourth bridge, and the second port of the fourth bridge is separately connected to the third port of the fourth bridge and the fourth port of the fourth bridge.

4. The communication apparatus according to claim 3, wherein the communication apparatus further comprises a first switch and a second switch;
the third port of the third bridge is connected to one end of the first switch, and the other end of the first switch is connected to the second port of the first bridge;
the fourth port of the second bridge is connected to one end of the second switch, and the other end of the second switch is connected to the first port of the fourth bridge; and
when the second transceiver and the third transceiver are turned off, or when the first transceiver and the fourth transceiver are turned off, the first switch and the second switch are turned off.

5. The communication apparatus according to claim 3, wherein the communication apparatus further comprises a second processor; and
the second processor is configured to separately perform weighted summation processing on a first baseband signal, a second baseband signal, a third baseband signal, and a fourth baseband signal based on a second weighting matrix, to obtain a fifth baseband signal, a sixth baseband signal, a seventh baseband signal, and an eighth baseband signal, wherein the fifth baseband signal is output to the first transceiver, the sixth baseband signal is output to the second transceiver, the seventh baseband signal is output to the third transceiver, the eighth baseband signal is output to the fourth transceiver, the second weighting matrix is an inverse matrix of a third weighting matrix, and the third weighting matrix is a combination bridge matrix obtained by determining based on a bridge matrix of the first bridge, a bridge matrix of the second bridge, a bridge matrix of the third bridge, a bridge matrix of the fourth bridge, and a connection relationship between the first bridge, the second bridge, the third bridge, and the fourth bridge.

6. The communication apparatus according to claim 1, wherein the communication apparatus further comprises a third switch; and
the second transceiver is connected to the first power amplifier through the third switch.

7. The communication apparatus according to claim 1, wherein the communication apparatus is a remote radio unit (RRU).

8. The communication apparatus according to claim 1, wherein the communication apparatus further comprises a first group of antennas, and the first power amplifier is connected to the first group of antennas.

9. The communication apparatus according to claim 8, wherein the communication apparatus is an active antenna unit (AAU).

10. The communication apparatus according to claim 1, wherein the communication apparatus is a base station.

* * * * *